(12) United States Patent
Teibel et al.

(10) Patent No.: US 6,363,427 B1
(45) Date of Patent: Mar. 26, 2002

(54) METHOD AND APPARATUS FOR A BULLETIN BOARD SYSTEM

(75) Inventors: Dan A. Teibel, Portland; Bradford H. Needham, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/216,648

(22) Filed: Dec. 18, 1998

(51) Int. Cl.[7] .............................................. G06F 13/00
(52) U.S. Cl. ........................... 709/227; 709/224; 380/21
(58) Field of Search .................................. 709/221, 224, 709/204, 227; 713/1, 10; 380/21, 27

(56) References Cited

U.S. PATENT DOCUMENTS

| 5,724,567 A | * | 3/1998 | Rose et al. | ...................... 713/1 |
|---|---|---|---|---|
| 5,774,670 A | * | 6/1998 | Motulli | ...................... 709/227 |
| 5,799,151 A | * | 8/1998 | Hoffer | ...................... 709/204 |
| 5,850,442 A | * | 12/1998 | Muftic | ...................... 380/21 |
| 5,893,114 A | * | 4/1999 | Hasjimoto et al. | ...................... 707/200 |
| 6,038,602 A | * | 3/2000 | Ishikawa | ...................... 709/227 |

* cited by examiner

Primary Examiner—Ayaz Sheikh
Assistant Examiner—Khanh Quang Dinh
(74) Attorney, Agent, or Firm—Steven D. Yates

(57) ABSTRACT

A method of electronic message exchange comprises reading other identifications of other personal data areas on other servers, reading from the other personal data areas other message identifications identifying other messages stored on the other personal data areas, and merging the other message identifications into a list of messages.

21 Claims, 4 Drawing Sheets

MACHINE-READABLE MEDIUM 400

BBS INSTRUCTIONS 410

INSTRUCTIONS TO READ FIRST MESSAGE ID
FROM FIRST SERVER             420

INSTRUCTIONS TO READ SECOND MESSAGE ID
FROM SECOND SERVER            430

INSTRUCTIONS TO MERGE FIRST AND SECOND MESSAGE
IDS INTO A LIST OF IDENTIFIED MESSAGES    440

INSTRUCTIONS TO COMPARE LIST OF IDENTIFIED
MESSAGES WITH THE APPROVAL LIST   450

INSTRUCTIONS TO PRODUCE THE INTERSECTION OF THE
LIST OF IDENTIFIED MESSAGES AND
THE APPROVAL LIST AS A LIST OF
IDENTIFIED MESSAGES APPROVED FOR READING
460

FIG. 4

METHOD AND APPARATUS FOR A BULLETIN BOARD SYSTEM

BACKGROUND

1. Field

The present invention relates to electronic message exchange and, more particularly, to message exchange using an electronic bulletin board system.

2. Background Information

The term "Bulletin Board System" or "BBS" refers to the reading and writing of electronic messages to a shared message exchange from which the messages may be accessed by persons (called "participants") who are members of the BBS. A BBS may be called a bulletin board or just board. Collectively, the members of a BBS may be called the BBS group. The collection of messages available on the board may be called the BBS messages.

BBS's may be moderated, meaning that one or more persons may view and approve the messages posted there. The messages may be encrypted so that they cannot be read except by persons who have the key to decrypt the messages. The messages may also be subject to expiration so that they are removed or deleted from the bulletin board when no longer deemed relevant or timely.

BBS implementations may be expensive and complicated to implement. For example, the UseNet BBS service on the Internet employs multiple servers, each with a dedicated Internet connection, each server merging and filtering the messages posted on each other server. A BBS participant may post a message on any one server on UseNet and have the message made available on the other UseNet servers, however, it would be expensive and complicated for a small or nonprofit group wishing to implement their own BBS service to employ multiple redundant servers in the manner implemented by UseNet.

SUMMARY

Identifications of other personal data areas on other servers are read, and other message identifications identifying other messages stored on the other personal data areas are read from the other personal data areas. The other message identifications are merged into a list of BBS messages.

BRIEF DESCRIPTION OF THE DRAWINGS

The subject matter regarded as the invention is particularly pointed out and distinctly claimed in the concluding portion of the specification. The invention, however, both as to organization and method of operation, may be further understood by reference to the following detailed description when read with the accompanying drawings.

FIG. 4 is a schematic diagram illustrating an embodiment of a machine-readable storage medium comprising a sequence of instructions to implement an embodiment of a BBS in accordance with the present invention.

DETAILED DESCRIPTION

The embodiments described herein enable a BBS with several desirable features. Some embodiments may be implemented without a central BBS server or the installation of a dedicated Internet connection by one or more BBS participants. The embodiments described herein are merely illustrative, and one skilled in the art will appreciate that numerous modifications can be made which nonetheless fall within the scope of the present invention.

BBS users typically have access to an Internet Service Provider (ISP), home page service, or other web server capable of hosting the user's web pages. For example, many ISPs provide a service by which users have access to an area of the ISP's servers on which the user may store personal information, such as a home page or other personal data. This area may also be accessed by the user to store one or more message identifications and BBS messages. The home page area or other personal data area of a particular participant may typically only be written with information from that particular participant; other participants (or other parties who are online and not members of the BBS group) will typically not have write privileges to a particular participant's personal data area. These others typically will, however, have read privileges to the information stored in the personal data area of a particular participant.

In one embodiment, the client associated with a participant in the BBS group may store one or more message identifications and messages on an area of a web server provided by the participant's ISP. The message identifications from other participants may be merged into a list by the client, and the client can then read one or more BBS messages identified in the list from one of the other participants' ISP-provided web servers.

Figure 1:
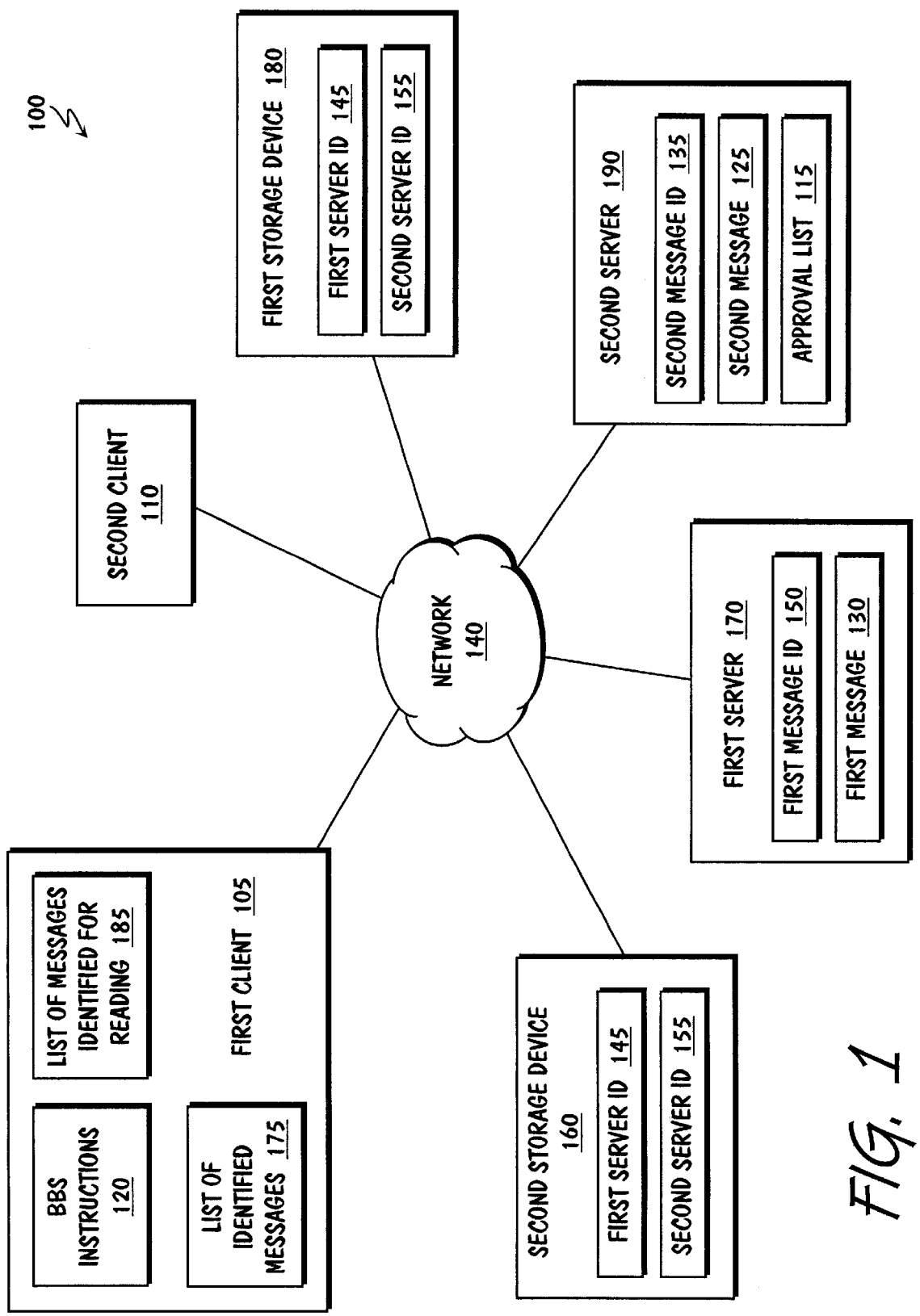
FIG. 1 is a schematic diagram illustrating an embodiment of a BBS in accordance with the present invention.

Referring now to FIG. 1, an embodiment 100 of a BBS in accordance with the present invention is illustrated. Clients 105 and 110 are coupled by way of a network 140 to: servers 170 and 190, and storage devices 180 and 160. In one embodiment, a client establishes a dial-up connection with an ISP to open a communication channel on the network 140, although other techniques for opening a channel on the network are possible within the scope of the invention. For example, clients coupled to a corporate intranet may open a channel on the network by executing a web browser application.

In embodiment 100, the clients 105 and 110 typically represent any data processing device comprising a processor capable of executing instructions, a bus coupled to the processor to supply the instructions to the processor, and a storage medium to store the instructions to be executed by the processor. For example, a personal computer, handheld computer, or information appliance (such as a set-top Internet device) may be employed. In one embodiment, the clients 105 and 110 comprise personal computers (PCs) including an Intel Corporation Pentium® or compatible processor, although the invention is not limited in scope in this respect.

In embodiment 100, the client 105 is shown comprising BBS instructions 120 which include sequences of instructions to implement an embodiment of a BBS as described below.

The servers 170 and 190 are data processing devices comprising special hardware and software which enables programs and data stored on the servers to be accessed over the network 140 by clients 105 and 110. For example, the servers may comprise computers running a variant of the UNIX™ operating system, or the Windows® NT® Server operating system from Microsoft Corporation. The technical differences that distinguish client and server devices are well known in the art and to elaborate in detail would only obscure the description of the present invention.

When each participant already has the privilege of having a home page or other personal data area on the ISP server or through some other arrangement or situation, an economical embodiment of a BBS may be possible by using those web servers to store BBS messages and message indications. In another embodiment, the servers 170 and 190 may be provided by a home page service such as GeoCities, Inc. The servers could also be provided by a combination of ISPs, home page services, and other arrangements or situations.

As illustrated in FIG. 1, server ids 145 and 155 which identify servers 170 and 190 and/or other servers on the network 140 may be stored on storage device 180 available to client 105. Server ids 145 and 155 (which likewise identify servers 170 and 190 and/or other servers) may be stored on storage device 160 available to client 110 (if one storage device is available to both clients, that storage device may be used in place of multiple devices 180 and 160). In one embodiment, the server ids comprise Internet Uniform Resource Locators (URLs). The manner is which URLs identify servers on a network is well known in the art and, in the interest of not obscuring the present invention, is not recited here. Again, URLs comprise only one possible embodiment, and the invention is not limited in scope in this respect. The server ids may be generated and maintained in various ways. In one embodiment, a BBS moderator (a person who may moderate and filter messages exchanged on the board) creates the server ids and stores them on one or both of the storage devices 180 and 160. In another embodiment, each participant may create and maintain the server ids, adding or deleting them from an available storage device in response to external communications such as email or phone calls from the other participants.

In embodiments where the server ids are generated and maintained by a third party, such as a moderator, group membership control may be maintained by the moderator by adding or deleting server ids from the storage devices. Once a server id is deleted, the associated participant may be dropped from the BBS group. Adding a server id to the storage devices may add a participant to the BBS group.

In one embodiment, storage device 180 and storage device 160 comprise network storage devices. For examples, the storage devices may comprise the hard drives on any network servers which may be accessed by the clients. Potential storage devices include a hard disk, a CD ROM, and a Read-Only Memory. Although not illustrated in embodiment 100, storage device 180 may also comprise a hard disk, CD ROM, ROM, or other storage medium which is local (not accessed through the network) to client 105. A local hard drive within client 105 is a common example of such a local storage medium. Likewise, storage device 160 may comprise a hard disk, CD ROM, ROM, or other storage medium local to client 110.

In one embodiment, the client 105 stores a message 130 and a message id 150 on the server 170. In like manner, the client 110 stores a message 125 and a message id 135 on the server 190. In one embodiment this is accomplished using the Internet File Transfer Protocol (FTP). Other well known protocols for this purpose include the Hyper Text Transfer Protocol (HTTP) and various remote file system protocols. The invention is in no way limited to the use of a particular protocol for storing the messages or message ids.

The messages 130 and 125 comprise any stored electronic signal, including but not limited to text, images, animation, binary data files, and digitized audio and video. The message identifications 150 and 135 may comprise any signal which identifies the messages 130 and 125. In one embodiment, the message identifications comprise URLs. The manner in which URLs identify data, such as the messages 130 and 125, is well known. In another embodiment, the message identifications 150 and 125 may be comprised by files, the files identified by URLs. In this embodiment, the file may comprise all message ids for the messages stored on a particular web server (for example, a single text file with a list of message ids delimited by a common symbol such as a comma or new line). The invention is in no way limited to a particular manner of storing or formatting the message ids.

In overview, the BBS instructions 120 may be executed by the client 105 so that the client may read the messages associated with the BBS group. In response to the BBS instructions 120, the client 105 may also: read the message identifications 150 and 135 from the servers 170 and 190, respectively; merge the message identifications 150 and 135 into a list of identified messages 175; and read one of the messages 130 and 125 identified by the list of identified messages 175. In one embodiment, moderation may be accomplished by designating one server to hold a list of approved messages. In this embodiment, each client is presented only messages on the approved list for reading. Referring again to FIG. 1, the client may, in response to execution of the BBS instructions 120, compare the list of identified messages 175 with an approval list 115 and present an intersection of the lists as a list of identified messages allowed for reading 185. The approval list 115 may be stored on one of the servers 170 and 190, or any other server coupled to the network. With this overview as a starting point, details are now presented to better explain the operation of one embodiment of the invention.

Those skilled in the art will recognize that in the following discussion, embodiments of the invention are possible comprising any number of clients and servers. For example, client 105 may in one embodiment read and merge identifications for messages stored by second, third, and fourth clients from second, third, and fourth servers.

In one embodiment, reading the message identifications 150 and 135 and the messages 130 and 125 (collectively the "message signals"), is accomplished using FTP. Other embodiments may, for example, use HTTP or various remote file system protocols. The invention is in no way limited to the use of a particular protocol for reading the message signals.

In one embodiment, merging the message identifications 150 and 135 into a list of identified messages 175 is accomplished by generating a single data file comprising the message identifications. The client 105 may then compare the list of identified messages 175 with the approval list 115 to generate the intersection of the lists. The approval list 115 may be generated by a third party (other than the participants associated with clients 105 and 110), including but not limited to a moderator of the BBS group.

BBS groups with limited resources, such as small and nonprofit groups, may employ an embodiment of the BBS described herein without purchasing expensive central server hardware or a dedicated Internet connection. Instead, web servers provided by the participant's ISP, web page hosting service, or online community, among numerous possible arrangements, may be used. If a web server associated with a client fails, that client may be disabled from posting messages, and the other clients may be prevented from reading messages from the disabled client, but otherwise this embodiment of a BBS operates appropriately. Also, the risk of a computing bottleneck may be reduced because each client's associated web server may contribute to the computing resources available to the BBS.

Some embodiments may operate in what is commonly referred to as a peer-to-peer fashion. Instead of storing all messages on one or more central exchanges, each client stores their messages on a personal area of a network server in an area to which they have write access. Other participants in the BBS group may store messages in their own personal areas on network servers to which they have write access. Each participant may read messages from the personal areas of the others, areas to which they do not have write access but do have read access privileges. In this regard, each participant acts as a peer to every other, reading messages from the personal areas of all others, but causing messages to be stored only on their own personal data area. Message exchange may occur without the implementation of a central message board. Each client may be responsible for adding and removing the messages from their personal area.

In addition to moderation, alternate embodiments of the present invention may include message encryption and expiration. In one embodiment, encryption may be implemented using, for example, a public key system, although other embodiments may use alternate encryption techniques. A first client, for example, may encrypt messages using a private key; the messages can be decrypted by a second client, using for example the first client's public key. Expiration may be implemented by each client deciding when to remove the messages posted by the client on their associated server, although the invention is not limited in scope in this respect.

Figure 2:
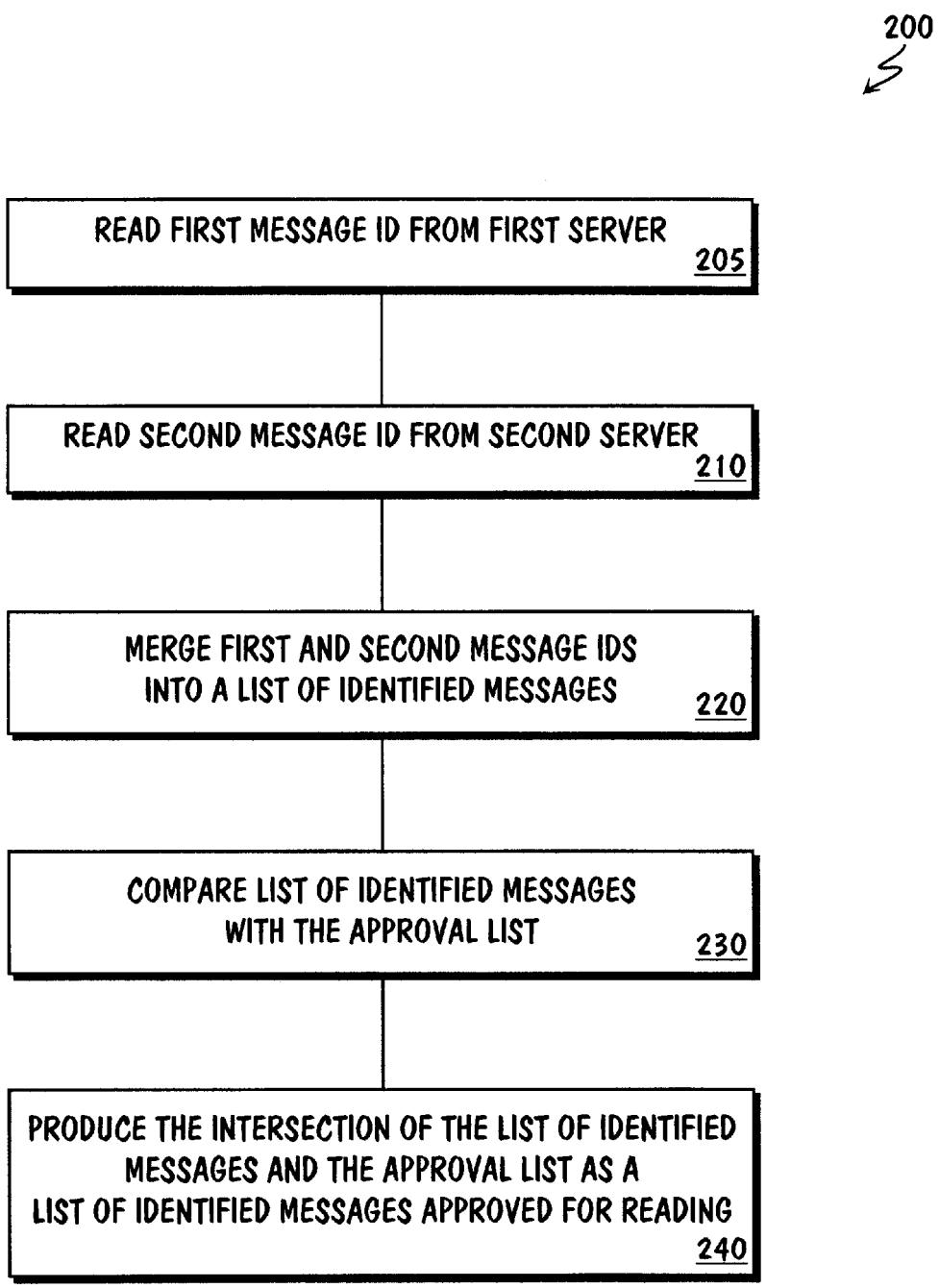
FIG. 2 is a flowchart illustrating one embodiment of a method to implement a BBS in accordance with the present invention.

Referring now to FIG. 2, one embodiment of a method 200 for implementing a BBS in accordance with the present invention is illustrated. At 205, a first message id may be read from a first server. At 210, a second message id may be read from a second server. The first and second message ids may be merged into a list of identified messages at 220. The first and second message ids and the first and second servers may comprise any of the possible embodiments described with respect to FIG. 1. For example, in one embodiment the clients may comprise PCs, the message ids comprise URLs, the message ids may themselves be identified by URLs, and the servers comprise web servers hosting the client's home pages or other personal data.

At 230, the list of identified messages may be compared with the approval list. The intersection of the list of identified messages and the approval list may be produced as a list of identified messages approved for reading at 240 and displayed to a BBS participant.

One skilled in the art will appreciate that the method of FIG. 2 need not occur in the particular order of illustration to remain within the scope of the present invention. For example, the first and second message ids may be read in any order.

Figure 3:
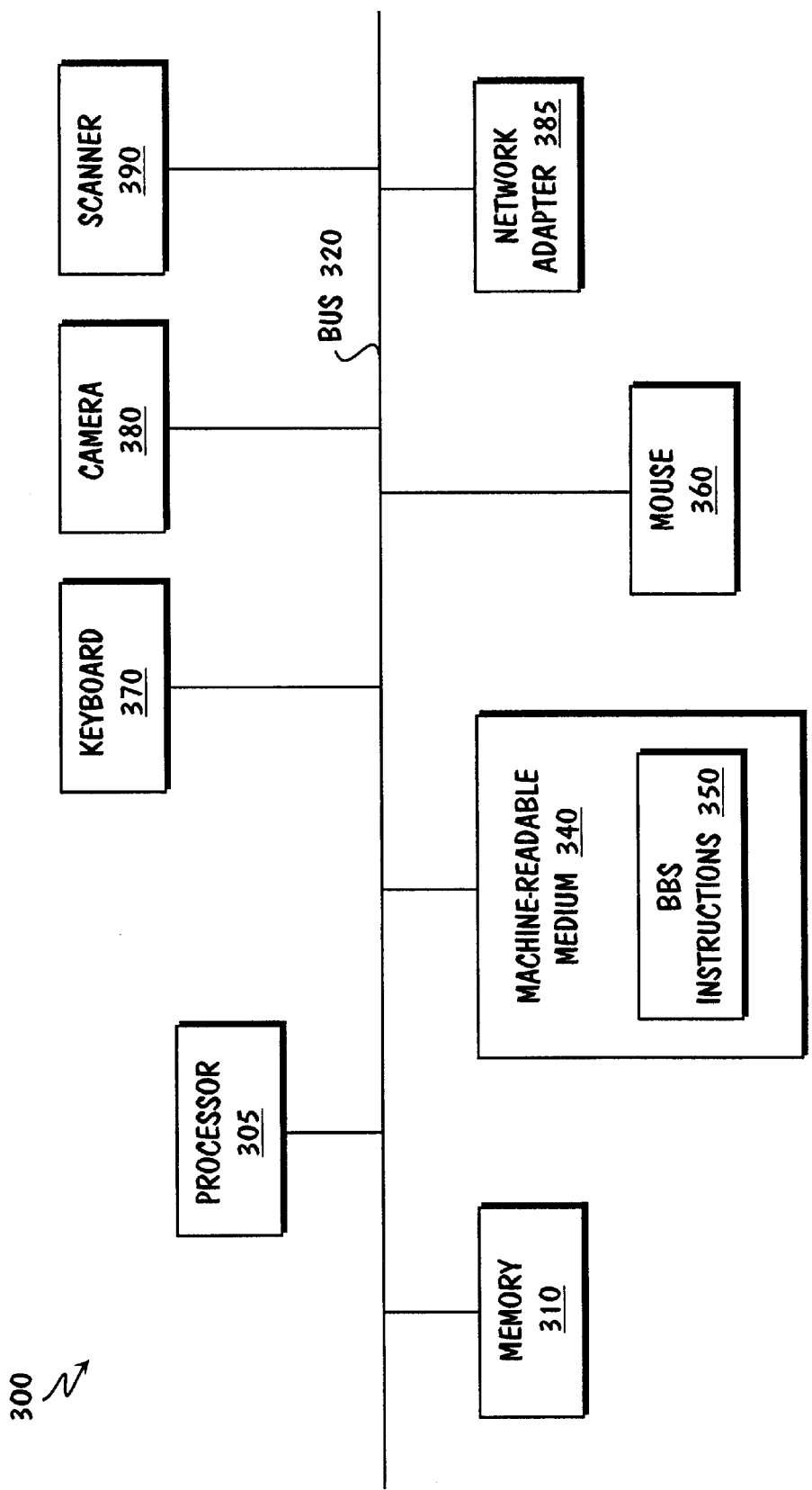
FIG. 3 is a schematic diagram illustrating an embodiment of a data processing device to implement an embodiment of a BBS in accordance with the present invention.

Referring now to FIG. 3, an embodiment of a data processing device 300 to implement an embodiment of a BBS in accordance with the present invention is illustrated. Embodiment 300 comprises a processor 305 to execute instructions supplied from a bus 320. The executed instructions are stored in a memory 310 from which they are supplied to the processor 305 by the bus 320 for execution. The processor 305 may execute any instruction set including, but not limited to, instruction sets supported by an Intel Corporation Pentium® processor or compatible processor. The bus 320 may be implemented using technologies for propagating signals including, but not limited to, electronic and optical conductors. The memory may include random access memory (RAM), read-only memory (ROM), or any other form of memory capable of storing instructions which may then be supplied to the processor 305 by the bus 320 for execution. Embodiment 300 may include a machine-readable storage medium 340 to store sequences of instructions which may be loaded into volatile memory 310 from which they may be supplied to processor 305 for execution. The machine-readable storage medium 340 may include, but is not limited to, a hard drive, a floppy drive, and a CD-ROM or other optical disk.

One skilled in the art will appreciate that in "diskless" devices without mass storage mediums, the machine-readable storage medium 340 may be omitted from the embodiment 300. Instructions, including BBS instructions 350, may then be stored in RAM, ROM, or other memory from which instructions may be directly accessed over the bus 320 by the processor 305 for execution.

To perform signal input/output, embodiment 300 comprises a mouse 360, a keyboard 370, a camera 380, and a scanner 390, each coupled to the bus 320 for transmitting data so that it may be easily accessed or manipulated by a user. The embodiment 300 further includes a network adapter 385 to couple the embodiment 300 to a network. Those skilled in the art will appreciate that for devices which perform dial-up access to the network, a modem may be disposed in place of or in addition to the network adapter 385.

In accordance with the present invention, embodiment 300 is shown storing BBS instructions 350 on the machine-readable storage medium 340. The BBS instructions include sequences of instructions for performing a method embodiment such as the one illustrated in FIG. 2. These instruction sequences are further illustrated in FIG. 4.

Referring now to FIG. 4, a schematic diagram illustrating an embodiment of a machine-readable storage medium 400 comprising a sequence of instructions 410 to implement an embodiment of a BBS in accordance with the present invention is shown. The machine-readable storage medium 400 may comprise RAM, ROM, a floppy disk, and hard disk, a CD ROM, or any other memory capable of storing sequences of instructions which may be executed by a data processing device such as, for example the device embodiment illustrated in FIG. 3. In this particular embodiment, the BBS instructions comprise sequences of instructions to carry out a method embodiment such as the one illustrated in FIG. 2, including but not limited to: instructions 420 to read a first message id from a first server; instructions 430 to read a second message id from a second server; instructions 440 to merge the first and second message ids into a list of identified messages; instructions 450 to compare the list of identified messages with the approval list; and instructions 460 to present the intersection of the list of identified messages and the approval list as a list of identified messages approved for reading. Of course, the invention is not limited in scope to this particular embodiment.

The manners of producing the machine-readable storage medium 400 storing sequences of instructions, such as BBS instructions 410, are well known in the art and to elaborate in detail would merely obscure the description of the present invention.

The list of messages approved for reading may be sorted such as, for example, sorted chronologically or by topic, although other sorting strategies are within the scope of the invention as well. Messages which have been read may be indicated or marked as "read", for example, allowing participants to track which messages have already been read.

In summary, embodiments of an advantageous BBS have been disclosed. In one embodiment, BBS participants may have access to an Internet Service Provider (ISP), home page service, or other web server capable of hosting the user's web pages or other personal data. Each participant may store one or more message identifications and messages on their associated home page or other personal data area. The message identifications from the home page or other personal data area of other participants may be merged by each participant's client device (typically, some form of data processing device such as a personal computer) and produced as a list of BBS messages. Each user may read one or more BBS messages using one or more of the message identifications from the list.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method of electronic message exchange comprising:
   reading an identification of a first personal network data area, the first personal network data area being a network-accessible storage area for which a first network user has write privileges;
   reading an identification of a second personal network data area, the second personal network data area being a network-accessible storage area for which a second network user has write privileges but for which the first network user does not have write privileges;
   reading a first message identification from the first personal network data area, the first message identification identifying a message stored on the first personal network data area;
   reading a second message identification from the second personal network data area, the second message identification identifying a message stored on the second personal network data area; and
   merging the first and second message identifications into a list of messages.

2. The method of claim 1 further comprising:
   storing the first message identification on the first personal network data area.

3. The method of claim 1 further comprising:
   displaying the list of messages to a first bulletin board system participant.

4. The method of claim 2 in which storing the first message identification on the first personal network data area further comprises:
   storing the first message identification on a first home page area on a first web server.

5. The method of claim 1, further comprising:
   comparing the list of messages with an approval list and producing an intersection as a list of messages approved for reading.

6. The method of claim 2 in which storing the first message identification on the first personal network data area further comprises:
   storing on the first personal data area a Uniform Resource Locator identifying the first message.

7. The method of claim 2 in which storing the first message identification on the first personal network data area further comprises:
   storing the first message identification on the first personal network data area provided by one of an ISP, home page service, and on-line community.

8. A device comprising:
   a processor;
   a machine-readable storage medium coupled to the processor by way of a bus, the storage medium storing a sequence of instructions which, when executed by the processor, cause the device to:
   read an identification of a first personal network data area, the first personal network data area being a network-accessible storage area for which a first network user has write privileges;
   read an identification of a second personal network data area, the second personal network data area being a network-accessible storage area for which a second network user has write privileges but for which the first network user does not have write privileges;
   read a first message identification from the first personal network data area, the first message identification identifying a message stored on the first personal network data area;
   read a second message identification from the second personal network data area, the second message identification identifying a message stored on the second personal network data area; and
   merge the first and second message identifications into a list of messages.

9. The device of claim 8 in which the sequence of instructions, when executed by the processor, further cause the device to:
   store the first message identification on the first personal network data area.

10. The device of claim 8 in which the sequence of instructions, when executed by the processor, further cause the device to:
    display the list of messages to a first bulletin board system participant.

11. The device of claim 9 in which the first personal network data area comprises a first home page area on a first web server.

12. The device of claim 8 in which the sequence of instructions, when executed by the processor, further cause the device to:
    compare the list of messages with an approval list and producing an intersection as a list of messages approved for reading.

13. The device of claim 9 in which the first message identification comprises a Uniform Resource Locator.

14. The device of claim 9 in which the first personal network data area is provided by one of an ISP, home page service, and on-line community.

15. An article comprising:
    a machine-readable storage medium having stored thereon instructions which, when executed by a data processing device, cause the data processing device to:
    read an identification of a first personal network data area, the first personal network data area being a network-accessible storage area for which a first network user has write privileges;
    read an identification of a second personal network data area, the second personal network data area being a network-accessible storage area for which a second network user has write privileges but for which the first network user does not have write privileges;
    read a first message identification from the first personal network data area, the first message identification identifying a message stored on the first personal network data area;

read a second message identification from the second personal network data area, the second message identification identifying a message stored on the second personal network data area; and merge the first and second message identifications into a list of messages.

16. The article of claim 15 in which the instructions, when executed by the data processing device, further cause the data processing device to:

store the first message identification on the first personal network data area.

17. The article of claim 15 in which the instructions, when executed by the data processing device, further cause the data processing device to:

display the list of messages to a first bulletin board system participant.

18. The article of claim 15 in which the first personal network data area comprises a first home page area on a first web server.

19. The article of claim 16, in which the instructions, when executed by the data processing device, further cause the data processing device to:

compare the list of BBS messages with an approval list and producing an intersection of the list of BBS messages and the approval list as a list of messages identified for reading.

20. The article of claim 16 in which the first message identification comprises a Uniform Resource Locator.

21. The article of claim 16 in which the first personal network data area on the first server is provided by one of an ISP, home page service, and on-line community.

* * * * *